United States Patent
Zhang et al.

(10) Patent No.: US 8,639,274 B2
(45) Date of Patent: Jan. 28, 2014

(54) METHOD AND APPARATUS FOR ENABLING COMMON CHANNEL COMMUNICATIONS OF SMS

(75) Inventors: Wentao Zhang, Beijing (CN); Yan Li, Bejing (CN); Jun Wang, La Jolla, CA (US); Masakazu Shirota, Tokyo (JP); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 13/153,256

(22) Filed: Jun. 3, 2011

(65) Prior Publication Data

US 2012/0052885 A1    Mar. 1, 2012

Related U.S. Application Data

(60) Provisional application No. 61/351,371, filed on Jun. 4, 2010.

(51) Int. Cl.
*H04W 68/00* (2009.01)
*H04W 72/00* (2009.01)

(52) U.S. Cl.
USPC ........................................ 455/458; 455/450

(58) Field of Classification Search
USPC ........... 455/458, 466, 426.1, 432.1, 436–442, 455/435.1–435.2, 450, 452.1, 448, 445
See application file for complete search history.

(56) References Cited

U.S. PATENT DOCUMENTS

| 6,094,576 A | 7/2000 | Hakkinen et al. | |
| 7,885,670 B2 * | 2/2011 | Gao et al. | 455/458 |
| 8,279,765 B2 * | 10/2012 | Sayeedi | 370/252 |
| 8,284,701 B2 * | 10/2012 | Vikberg et al. | 370/259 |
| 2006/0114885 A1 * | 6/2006 | Baek et al. | 370/352 |
| 2010/0049789 A1 * | 2/2010 | Zhao | 709/203 |
| 2010/0098023 A1 * | 4/2010 | Aghili et al. | 370/331 |
| 2010/0172301 A1 * | 7/2010 | Watfa et al. | 370/328 |
| 2010/0317348 A1 * | 12/2010 | Burbidge et al. | 455/436 |
| 2010/0317378 A1 * | 12/2010 | Fang et al. | 455/466 |
| 2011/0176414 A1 * | 7/2011 | De Franca Lima et al. | 370/230 |

OTHER PUBLICATIONS

3GPP2: "Short Message Service (SMS) for Wi deband Spreadspectrum SystemsRel ease A 3GPP2 C.S0015-A", 3 (Sep. 30, 2005), pp. 1-2-19. XP002676569, Retrieved from the Internet: URL:http://www.3gpp2.org/publ ic - html/specs /C.S0015-A v2.0 051006.pdf [retri eved-on 2812-05-24] Section 2.4.1.

(Continued)

*Primary Examiner* — Brandon Miller
(74) *Attorney, Agent, or Firm* — Kristine U. Ekwueme

(57) ABSTRACT

A method, an apparatus, and a computer program product for wireless communication are provided in which 1×CSFB for communication of SMS messages in an LTE environment may be avoided. An IWS may receive a paging request message from a MSC, wherein the paging request message includes a first SMS service option indicating communication of a SMS message using a first RAT. The IWS may avoid an ESR procedure by analyzing the first SMS service option in the paging request message. Further the IWS may establish a common channel connection between the IWS and a target UE using a second RAT, wherein the first RAT and the second RAT are different.

40 Claims, 14 Drawing Sheets

(56) References Cited

OTHER PUBLICATIONS

3GPP2: "Interoperability Specification (1os) for High Rate PacketData (HRPD) Radio Access Network Interfaces withsession Control in the Access Network 3GPP2 A.S0008-C v3.0", i Jun. 2010 (Jun. 1, 2010), pp. 4-12-4-35, XP002676568, Retrieved from the Internet: URL:http://www.3gpp2.org/public - html/specs /A.S0008-C v3.0 100621.pdf [retrieved-on May 24, 2012] Section 4.5.1.1 Section 4.5.1.2.

3rd Generation Partnership Project; Technical Specification Group Services and System Aspects; Circuit Switched (CS) fallback in Evolved Packet System (EPS); Stage 2 (Release 9 ), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V9.3.0, Mar. 26, 2010, pp. 1-66, XP050402081, [retrieved on Mar. 26, 2010].

International Search Report and Written Opinion—PCT/CN2011/ 039331—ISA/EPO—Aug. 2, 2012.

Zang H. et al., "Mining call and mobility data to improve paging efficiency in cellular networks", Sep. 9, 2007, pp. 1-12, XP55032020.

* cited by examiner

METHOD AND APPARATUS FOR ENABLING COMMON CHANNEL COMMUNICATIONS OF SMS

CROSS-REFERENCE TO RELATED APPLICATION(S)

This application claims the benefit of U.S. Provisional Application Ser. No. 61/351,371, entitled "Method and Apparatus for Traffic Channel SMS for LTE/1×CSFB" and filed on Jun. 4, 2010, which is expressly incorporated by reference herein in its entirety.

BACKGROUND

1. Field

The present disclosure relates generally to communication systems, and more particularly, to a system and method to avoid 1× circuit switched fall back (1×CSFB) for communication of SMS messages in an LTE environment.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access through improved spectral efficiency, lower costs, improved services, use of new spectrum, and better integration with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in relation to avoiding 1×CSFB for communication of SMS messages in an LTE environment. According to one aspect, a method in wireless communications is provided. The method can include receiving, by an interworking solution (IWS), a paging request message from a mobile switching center (MSC), wherein the paging request message includes a first SMS service option indicating communication of a SMS message using a first radio access technology (RAT). Further, the method can include prompting the IWS to avoid an extended service request (ESR) procedure by analyzing the first SMS service option in the paging request message. Moreover, the method can include establishing a common channel connection between the IWS and a target UE using a second RAT, wherein the first RAT and the second RAT are different.

Another aspect relates to an apparatus. The apparatus can include a processing system configured to receive, by an IWS, a paging request message from a MSC, wherein the paging request message includes a first SMS service option indicating communication of a SMS message using a first RAT. Further, the processing system may be configured to prompt the IWS to avoid an ESR procedure by analyzing the first SMS service option in the paging request message. Moreover, the processing system may be configured to establish a common channel connection between the IWS and a target UE using a second RAT, wherein the first RAT and the second RAT are different.

Another aspect relates to a computer program product comprising a computer-readable medium. The computer-readable medium comprising code for receiving, by an IWS, a paging request message from a MSC, wherein the paging request message includes a first SMS service option indicating communication of a SMS message using a first RAT. Further, the computer-readable medium may comprise code for prompting the IWS to avoid an ESR procedure by analyzing the first SMS service option in the paging request message. Moreover, the computer-readable medium may comprise code for establishing a common channel connection between the IWS and a target UE using a second RAT, wherein the first RAT and the second RAT are different.

Yet another aspect relates to an apparatus. The apparatus may comprise means for receiving, by an IWS, a paging request message from a MSC, wherein the paging request message includes a first SMS service option indicating communication of a SMS message using a first RAT. Further, the apparatus may include means for prompting the IWS to avoid an ESR procedure by analyzing the first SMS service option in the paging request message. Moreover, the apparatus may include means for establishing a common channel connection between the IWS and a target UE using a second RAT, wherein the first RAT and the second RAT are different.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
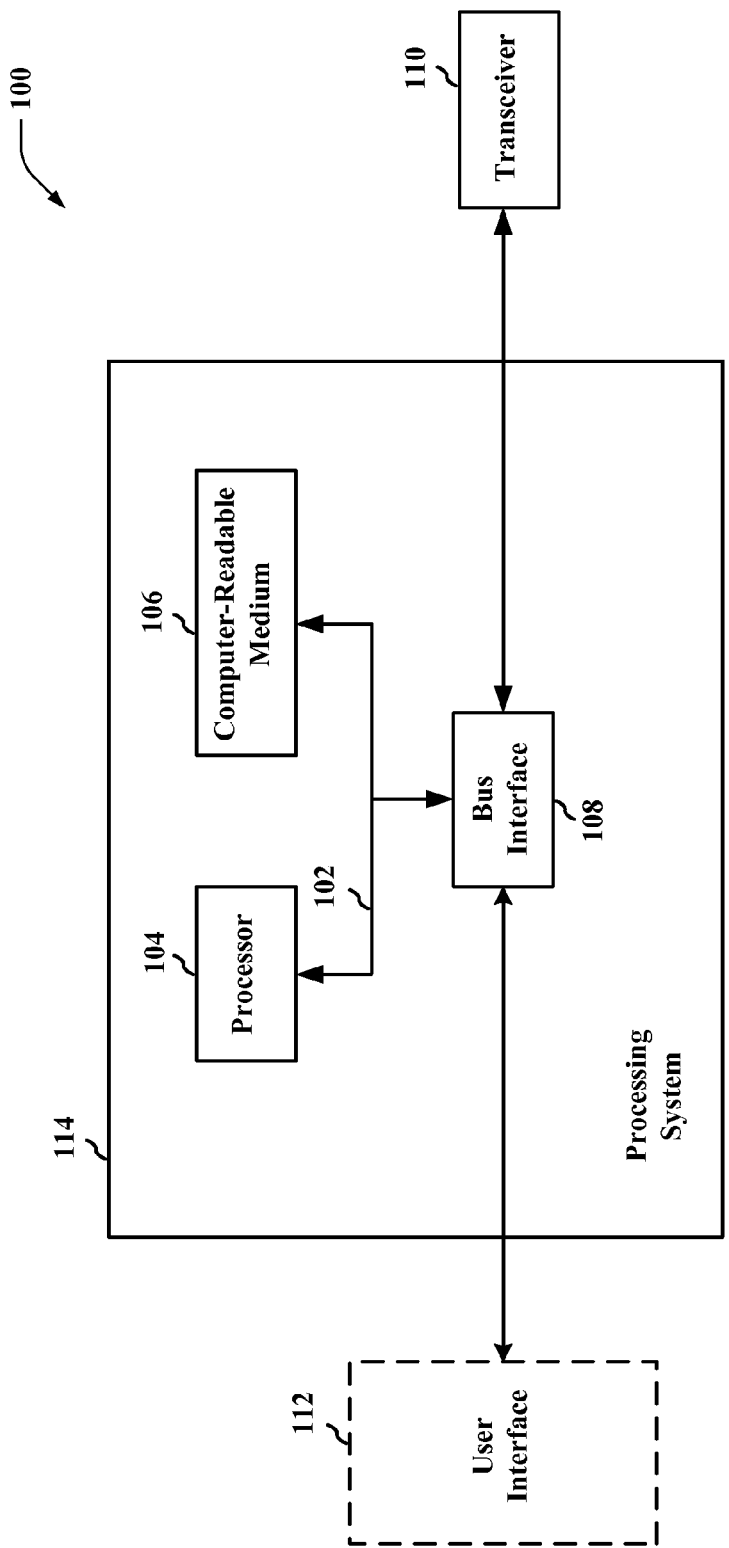
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
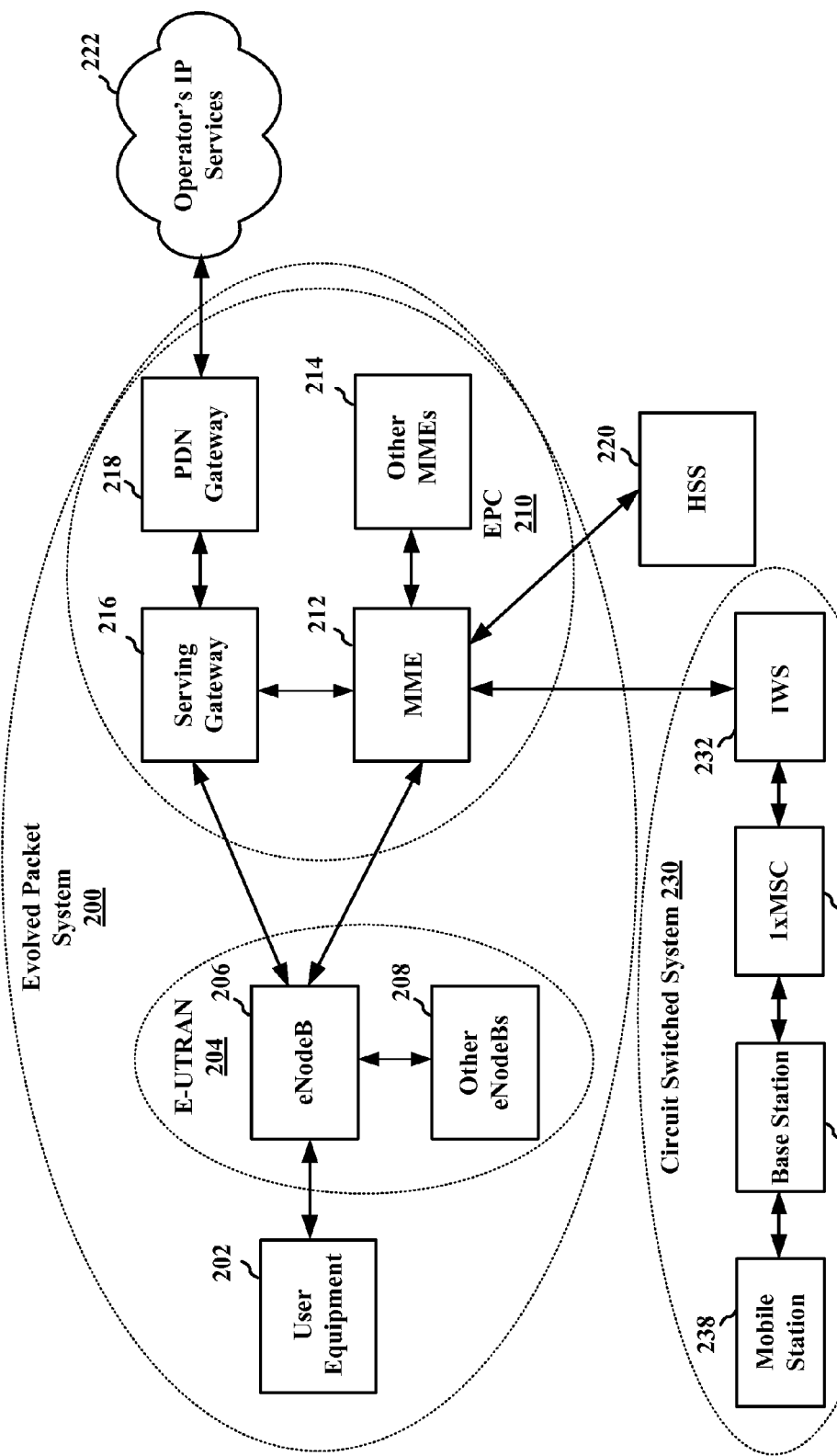
FIG. 2 is a diagram illustrating an example of a network architecture.

FIG. 2 is a diagram illustrating an Enhanced Packet System architecture 200 employing various apparatuses 100 (See FIG. 1). The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, such as a circuit switched network 230. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

The circuit switched system 230 includes an interworking solution (IWS) 232, a mobility switching center (MSC) 234, a base station 236, and a mobile station 238. In one aspect, circuit switched system 230 may communicate with EPS 200 through the IWS 232 and MME 212. FIGS. 5-11 discuss various operational processes in which the circuit switched system 230 may communicate with the EPS 200. In one aspect, an SMS message may be communicated from an MSC 234 to a UE 202 within initiating a 1×CSFB procedure.

Generally, a UE 202 in LTE air interface can receive and send a SMS message without implementing an ESR procedure and/or performing TECH/991539.1 CSFB. Previously, if a SMS message size was longer than a threshold value, the SMS message would be transmitted over a traffic channel. Further, where a traffic channel is used, the UE implements an ESR to fall back to 1× using 1×CSFB procedure to set up a 1× traffic channel. As described herein, IWS 232 may be configured to avoid initiating a 1×CSFB procedure. Various schemes to avoid implementing a 1×CSFB are discussed in detail with respect to FIGS. 5-11.

Figure 3:
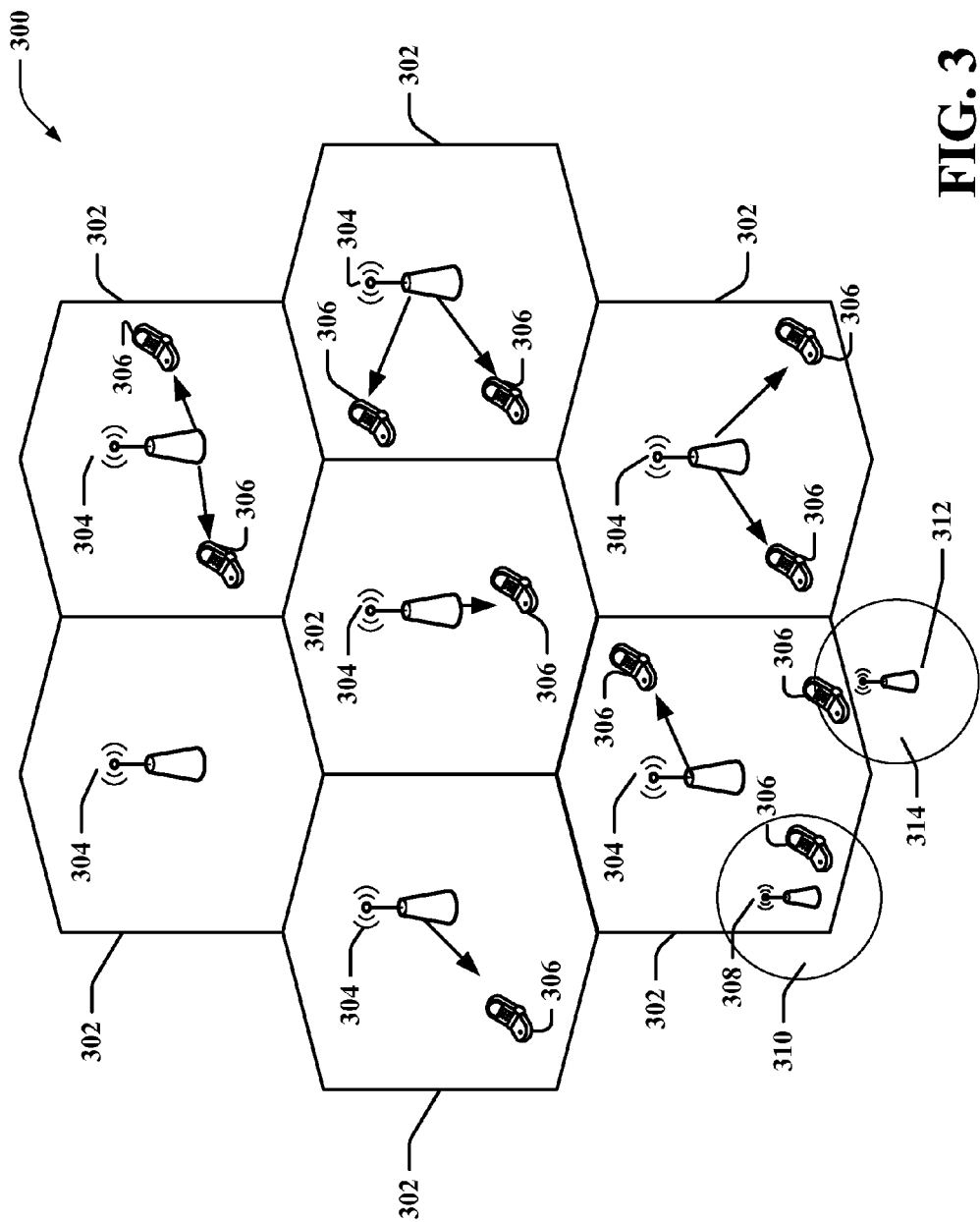
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 4:
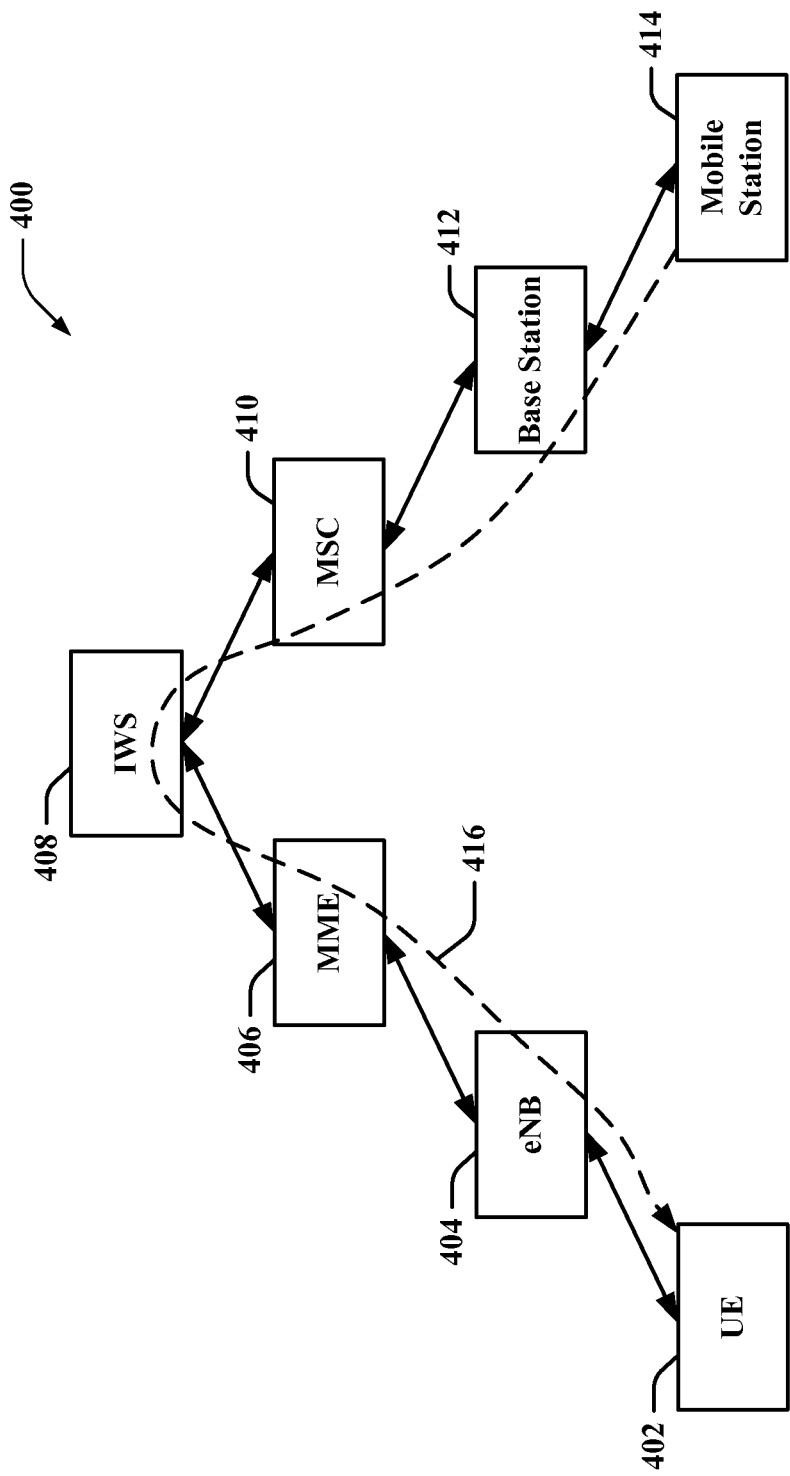
FIG. 4 is a diagram illustrating another example of an access network according to an aspect.

FIG. 4 is a diagram illustrating an example of an access network 400 in which an SMS message may be communicated from mobile station 414 to UE 402 without implementing 1×CSFB and/or ESR. A mobile station 414 may transmit an SMS message with a UE 402 as a given target. FIG. 4 depicts the path 416 the SMS message may be communicated upon according to an aspect. In operation, a mobile station 414 may generate an SMS message and transmit the message to a serving base station 412. The serving base station 412 may communicate the message to MSC 410 which may then communicate the message to IWS 408. As depicted in FIG. 4, UE 402 may be configured to be supported on an LTE network. Further discussion on various communications between the IWS 408, MSC 410 and between the IWS 408 and MME 406 are provided with reference to FIGS. 5-11. Once the SMS message has been processing so as to avoid initiating a 1×CSFB procedure, according to one or more processes described with reference to FIGS. 5-11, the SMS message is communicated over the LTE network from MME 406 to a serving eNB 404, and to the target UE 402.

FIGS. 5, 6, 7, 8, 9, 10, 11 and 13 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Generally, with respect to FIGS. 5-11, communications between a UE and an eNB may be supported using an LTE RAT with uplink and downlink information transfer. Further, communications between the eNB and a MME may be supported through an S1 interface and may provide for S1 cdma2000 tunneling. Still further, communications between the MME and an IWS may be supported through an S102 interface and may provide for A21 interface signaling.

Figure 5:
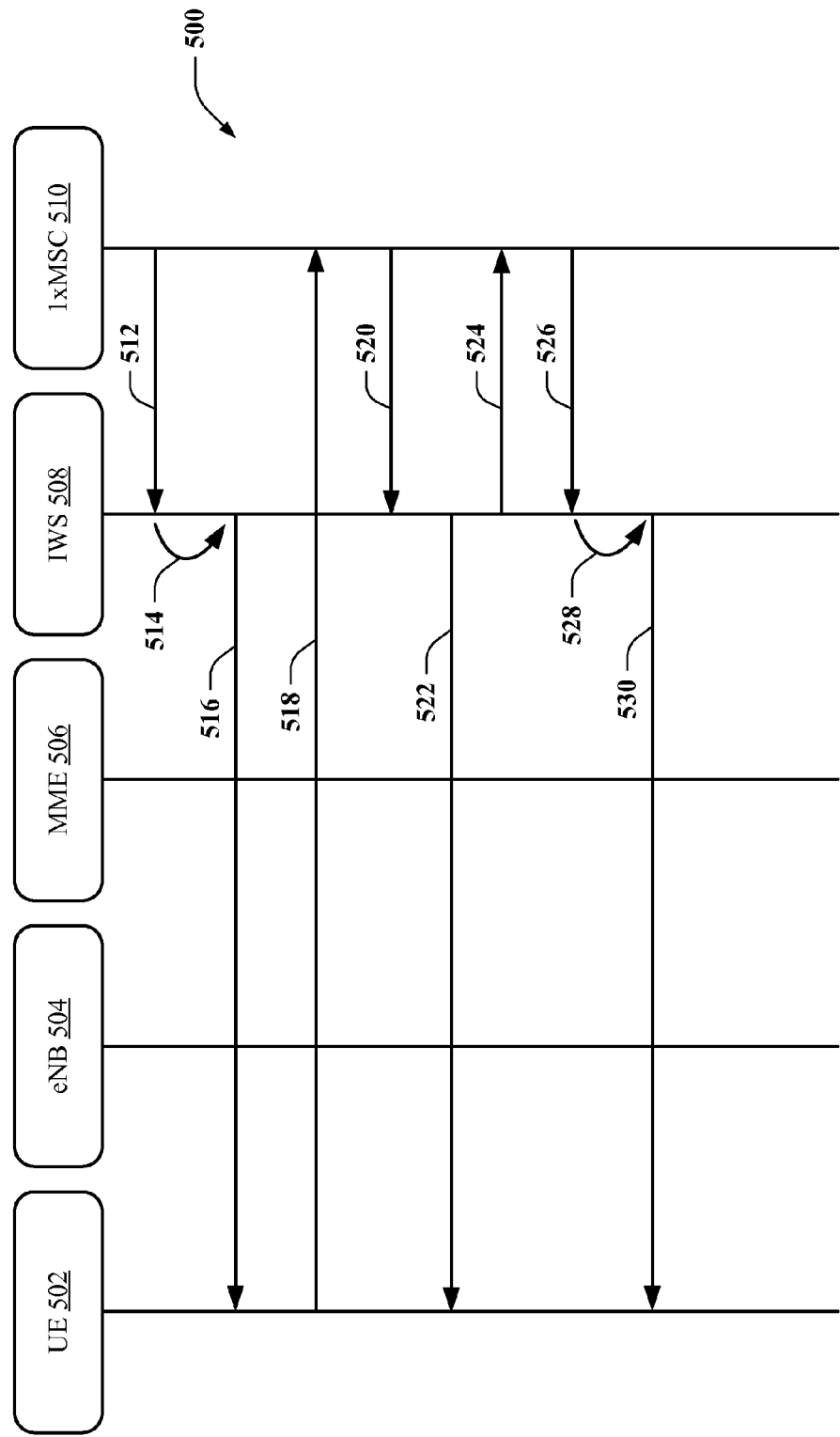
FIG. 5 is a call flow diagram describing an example system for enabling SMS communications over a common channel according to an aspect.

FIG. 5 illustrates a call flow diagram flowchart describing a system 500 for avoiding 1×CSFB for communication of SMS messages in an LTE environment. System 500 includes a UE 502, such as UE 202, eNB 504, such as eNB 206, MME 506, such as MME 212, IWS 508, such as IWS 232, and 1×MSC 510, such as 1×MSC 234.

In one aspect, system 500 allows MSC 510 to reuse current 1×IOS A1 interface call flows when sending UE terminated long SMS. Additionally, system 500 provides receiving the long SMS message in an LTE tunnel.

At act 512, MSC 510 may send a page request message to IWS 508 indicating a SMS message to be transmitted over the first RAT. In one aspect, if a received SMS message is long, MSC 510 may determine for the SMS message to be sent over a 1× traffic channel to a UE 502. In such an aspect, MSC 510 may include a first SMS service option (e.g., SO 6 or 14) with the page request message.

At act 514, IWS 508 determines that MSC 510 has indicated that the SMS message may be transmitted using a 1× traffic channel. In one aspect, IWS 508 replaces the first SMS service option with the new service option (e.g., a tunneling service option) for tunneling the SMS message using an LTE RAT.

At act 516, IWS 508 sends the paging message to UE 502 through MME 506 (e.g., using an A21 tunnel) and eNB 504. In one aspect, if the UE 502 is in LTE idle state, the MME 506 performs a network initiated service request procedure in order to bring the UE 502 into a LTE active state prior to tunneling the paging request message.

At act 518, because the tunneled 1× page message includes the new service option (e.g., tunneling service option) for tunneling the SMS message, UE 502 does not perform an extended service request procedure. Rather, UE 502 sends a page response message in an uplink information transfer message to eNB 504. The page response message then is forwarded to IWS 508 through the tunnel (e.g., over an S1 tunnel and S102 tunnel). After receiving the page response from MME 506, IWS 508 forwards the message to 1×MSC 510 with replacing the tunneling service option back to the first SMS service option.

At act 520, MSC 510 sends an assignment request message to the IWS 508. At act 522, IWS 508 sends a release order to UE 502 to allow UE 502 to return to a cdma2000 1× idle state, while also stays in RRC connected state. At act 524, IWS 508 sends an assignment complete message to MSC 510. In one aspect, MME 506 also sends an acknowledge message to IWS 508.

At act 526, MSC 510 sends a message including the SMS message. In one aspect, the message is conveyed using an ADDS Deliver message. The ADDS Deliver message contains SMS message in the ADDS User Part element.

At act 528, IWS 508 processes the received message including the SMS message into a common channel data burst message. In one aspect, the common channel data burst message is communicated through the established tunnel (e.g., A21 tunnel).

At act 530, IWS 508 sends the SMS message to MME 506 in the data burst message as a common channel 1× Radio Transmission Technology (RTT) data burst message over A21 tunnel. In one aspect, MME then forwards the common channel 1×RTT data burst message to UE 502. In one aspect, if a Layer 2 Ack was solicited, UE 502 acknowledges the receipt of the message (e.g., through a GCSNA L2 Ack). In such an aspect, if MSC 510 has requested a response by including a tag element in an ADDS Deliver message, IWS 508 replies with an ADDS Deliver Ack message when IWS 508 has received acknowledgment from the UE 502 that the message was delivered.

Figure 6:
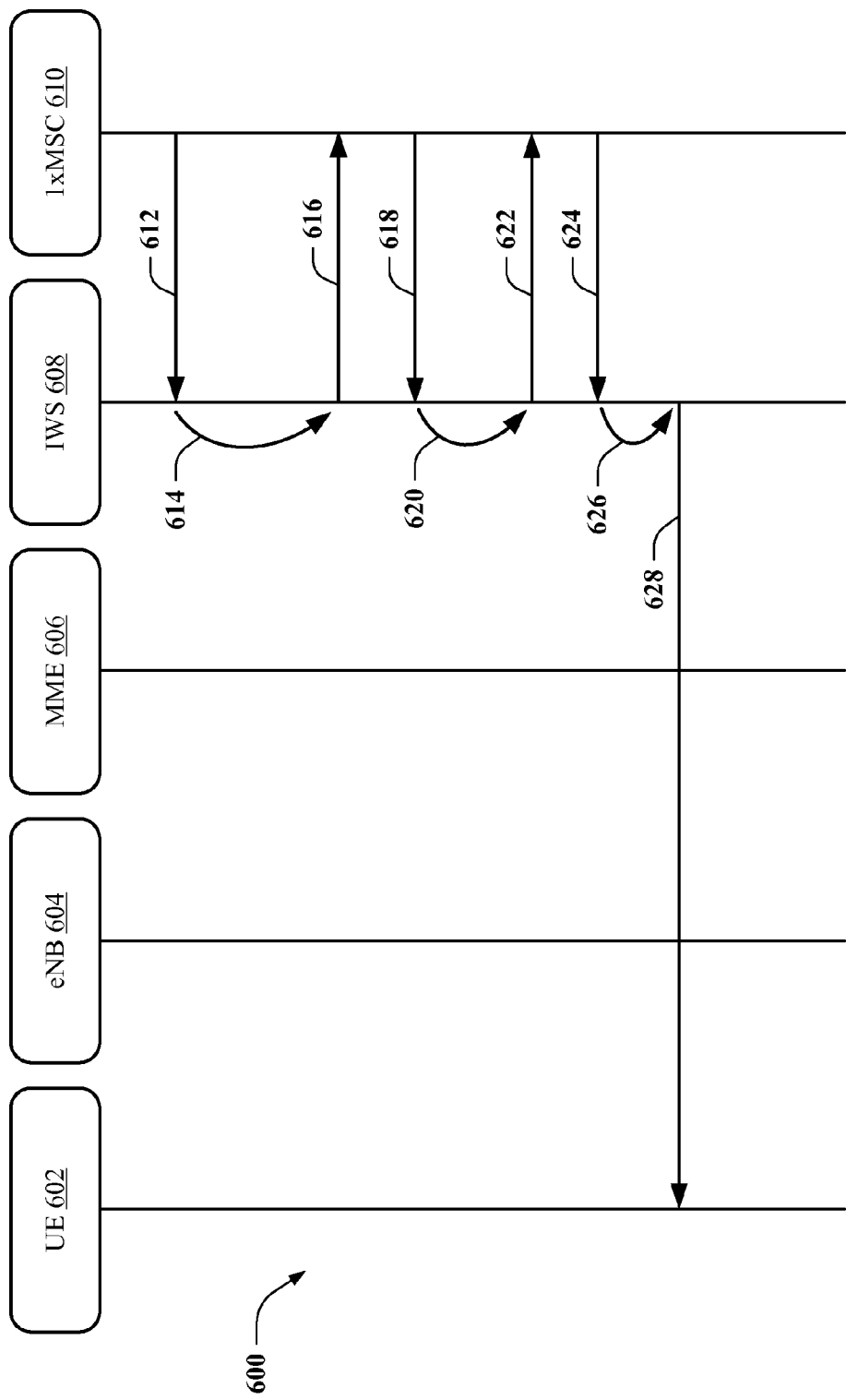
FIG. 6 is a call flow diagram describing another example system for enabling SMS communications over a common channel according to an aspect.

FIG. 6 illustrates a call flow diagram flowchart describing a system 600 for avoiding 1×CSFB for communication of SMS messages in an LTE environment. System 600 includes a UE 602, such as UE 202, eNB 604, such as eNB 206, MME 606, such as MME 212, IWS 608, such as IWS 232, and 1×MSC 610, such as 1×MSC 234.

In system 600, UE 602 authentication is disabled. As such, IWS 508 does not send a paging message to UE 602 and instead generates a page response message itself.

At act 612, MSC 610 sends a page request message to IWS 608 indicating a SMS message to be transmitted over the first RAT. In one aspect, if a received SMS message is long, MSC 610 determines for the SMS message to be sent over a 1× traffic channel to a UE 602. In such an aspect, MSC 610 includes a first SMS service option (e.g., SO 6 or 14) with the page request message.

At act 614, IWS 608 receives the paging request message with the first SMS service option and IWS 608 constructs a paging response message without authentication parameters. In one aspect, IWS 608 includes the generated message in a complete layer 3 information message. At act 616, IWS 608 sends the message to the MSC 610.

At act 618, MSC 610 sends an assignment request message to the IWS 608. At act 620, IWS 620 processes the assignment request message without any communication with UE 602 or MME 606. At act 622, IWS 608 sends an assignment complete message to MSC 610.

At act 624, MSC 610 sends a message including the SMS message. In one aspect, the message is conveyed using an ADDS Deliver message. The ADDS Deliver message contains SMS message in the ADDS User Part element.

At act 626, IWS 608 processes the received message including the SMS message into a common channel 1×RTT data burst message. In one aspect, the common channel 1×RTT data burst message is communicated through the established tunnel (e.g., A21 tunnel).

At act 628, IWS 608 sends the SMS message to MME 606 in the common channel 1×RTT data burst message as a common channel message over A21 tunnel. In one aspect, MME then forwards a common channel 1×RTT data burst message to UE 602. In one aspect, if a Layer 2 Ack was solicited, UE 602 acknowledges the receipt of the message (e.g., through a GCSNA L2 Ack). In such an aspect, if MSC 610 has requested a response by including a tag element in an ADDS Deliver message, IWS 608 replies with an ADDS Deliver Ack message when IWS 608 has received acknowledgment from the UE 602 that the message was delivered.

Figure 7:
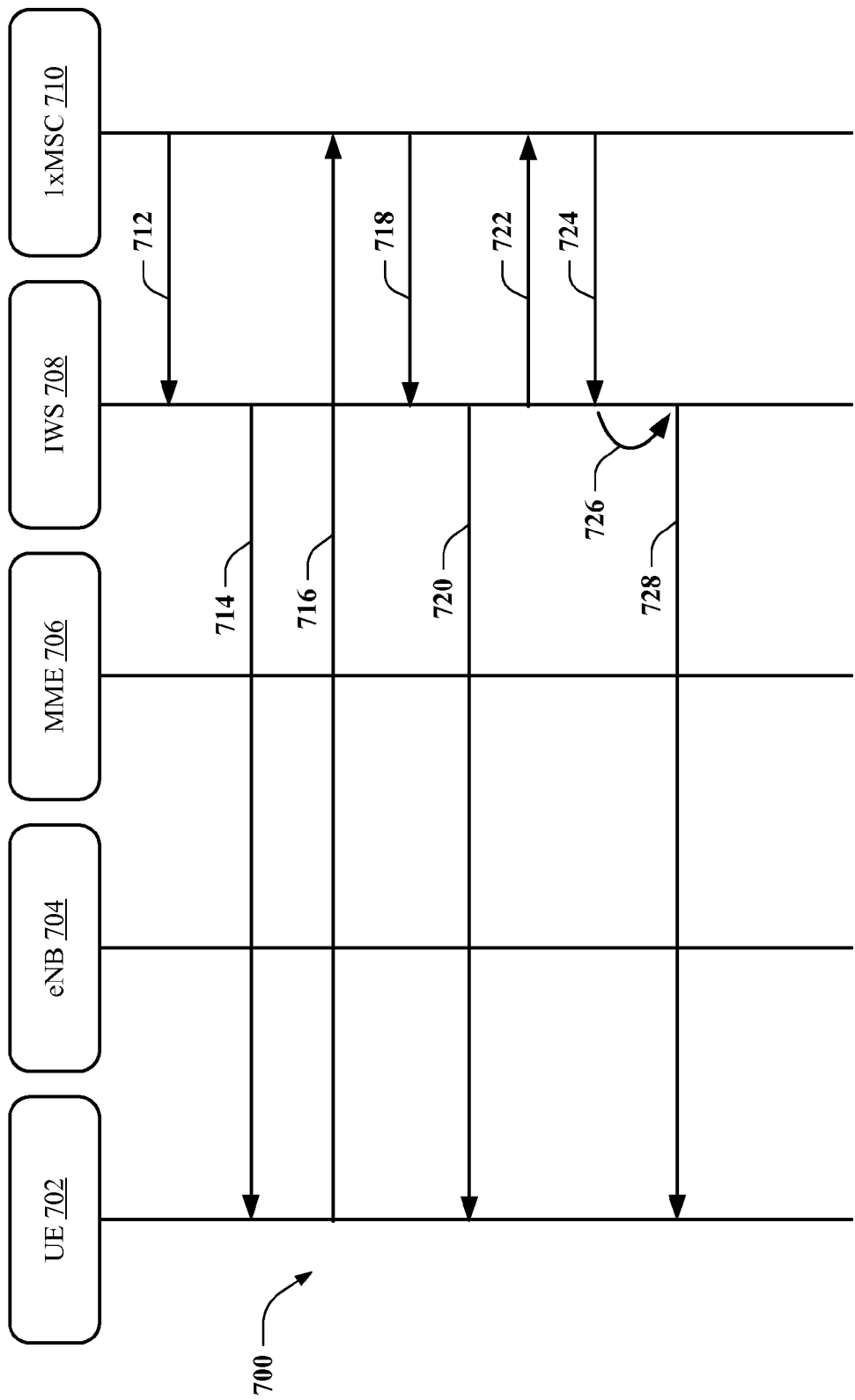
FIG. 7 is a call flow diagram describing another example system for enabling SMS communications over a common channel according to an aspect.

FIG. 7 illustrates a call flow diagram flowchart describing a system 700 for avoiding 1×CSFB for communication of SMS messages in an LTE environment. System 700 includes a UE 702, such as UE 202, eNB 704, such as eNB 206, MME 706, such as MME 212, IWS 708, such as IWS 232, and 1×MSC 710, such as 1×MSC 234.

In system 700, IWS 708 relays the paging request received from MSC 710 without replacing the first service option with a tunneling service option. In such an aspect, the UE 702 is configured to interpret the received paging message and respond without implementing an ESR procedure.

At act 712, MSC 710 sends a page request message to IWS 708 indicating a SMS message to be transmitted over the first RAT. In one aspect, if a received SMS message is long, MSC 710 determines for the SMS message to be sent over a 1× traffic channel to a UE 702. In such an aspect, MSC 710 includes a first SMS service option (e.g., SO 6 or 14) with the page request message.

At act 714, IWS 708 sends the received paging request message to UE 702 through MME 706 using the LTE RAT (e.g., over an A21 tunnel). In one aspect, if the UE 702 is in LTE idle state, the MME 706 performs a network initiated service request procedure in order to bring the UE 702 into a LTE active state prior to tunneling the paging request message.

At act 716, UE 702 receives the paging request message with the first service option included by MSC 710. In one aspect, UE 702 is configured to process the received first SMS service option in the context of the supporting LTE environment. In such an aspect, UE 702 does not perform the ESR. Rather, UE 702 sends a page response message in the uplink information transfer message to eNB 704. eNB 704 forwards the page response message to IWS 708 (e.g., through the S1 and S102 tunnels). After receiving page response from UE 702, through MME 706, IWS 708 relays the page response message to 1×MSC 710.

At act 718, MSC 710 sends an assignment request message to the IWS 708. At act 720, IWS 708 sends a release order to UE 702 to allow UE 702 to return to a cdma2000 1× idle state, while also staying in RRC connected state. At act 722, IWS 708 sends an assignment complete message to MSC 710.

At act 724, MSC 710 sends a message including the SMS message. In one aspect, the message is conveyed using an ADDS Deliver message. In one aspect, the ADDS Deliver message contains SMS message in the ADDS User Part element.

At act 726, IWS 708 processes the received message including the SMS message into a common channel 1×RTT data burst message. In one aspect, the common channel 1×RTT data burst message is communicated through the established tunnel (e.g., A21 tunnel).

At act 728, IWS 708 sends the SMS message to MME 706 in the 1×RTT data burst message as a common channel message over the A21 tunnel. In one aspect, MME then forwards a common channel 1×RTT data burst message to UE 702. In one aspect, if a Layer 2 Ack was solicited, UE 702 acknowledges the receipt of the message (e.g., through a GCSNA L2 Ack). In such an aspect, if MSC 710 has requested a response by including a tag element in an ADDS Deliver message, IWS 708 replies with an ADDS Deliver Ack message when IWS 708 has received acknowledgment from the UE 702 that the message was delivered.

Figure 8:
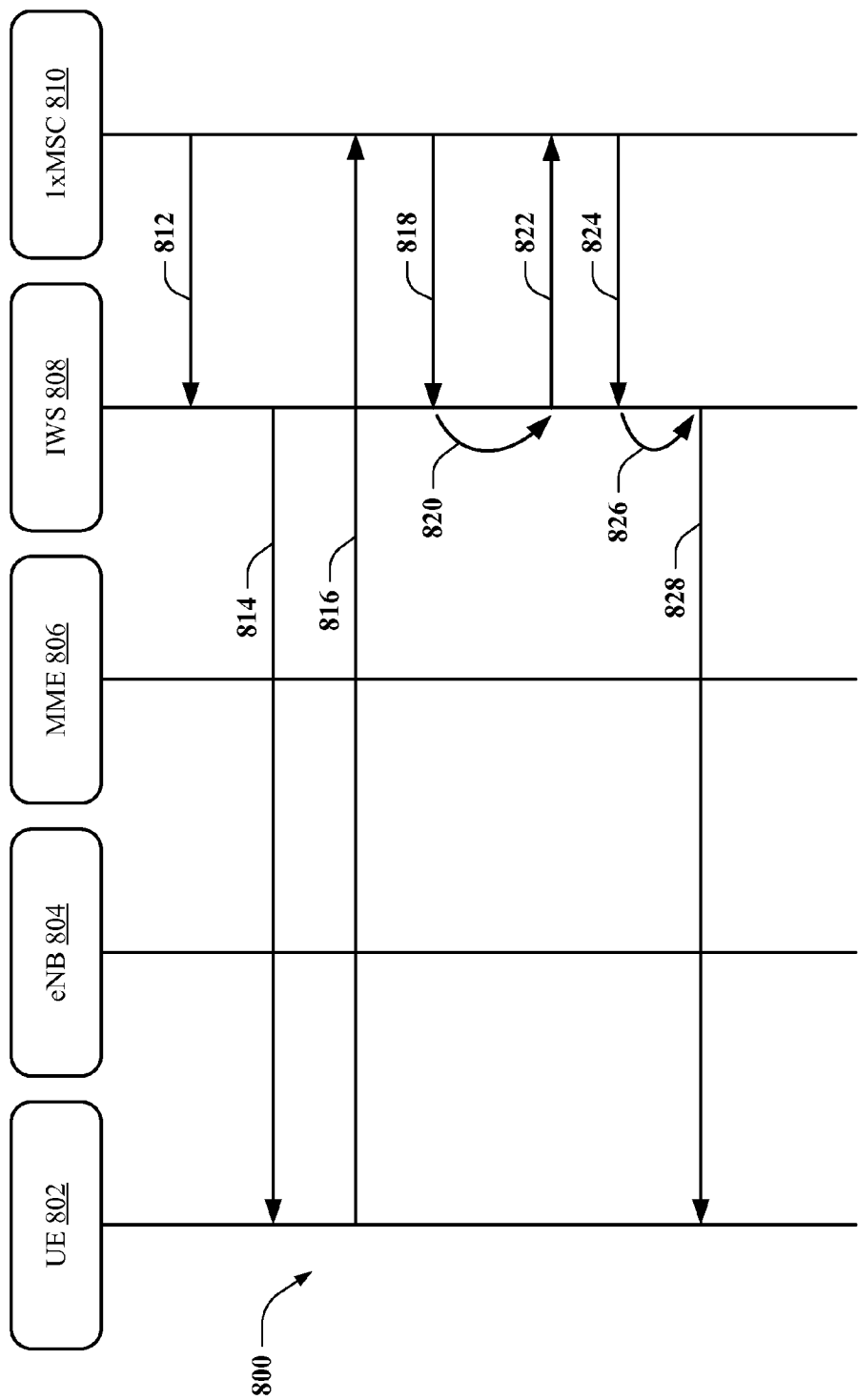
FIG. 8 is a call flow diagram describing another example system for enabling SMS communications over a common channel according to an aspect.

FIG. 8 illustrates a call flow diagram flowchart describing a system 800 for avoiding 1×CSFB for communication of SMS messages in an LTE environment. System 800 includes a UE 802, such as UE 202, eNB 804, such as eNB 206, MME 806, such as MME 212, IWS 808, such as IWS 232, and 1×MSC 810, such as 1×MSC 234. In system 800, a process is implemented, such as described in FIG. 7, without releasing UE 802.

At act 812, MSC 810 sends a page request message to IWS 808 indicating a SMS message to be transmitted over the first RAT. In one aspect, if a received SMS message is long, MSC 810 determines for the SMS message to be sent over a 1× traffic channel to a UE 802. In such an aspect, MSC 810 includes a first SMS service option (e.g., SO 6 or 14) with the page request message.

At act 814, IWS 808 sends the received paging request message to UE 802 (e.g., over an A21 tunnel). In one aspect, if the UE 802 is in LTE idle state, the MME 806 performs a network initiated service request procedure in order to bring the UE 802 into a LTE active state prior to tunneling the paging request message.

At act 816, UE 802 receives the paging request message with the first service option included by MSC 810. In one aspect, UE 802 is configured to process the received first service option in the context of the supporting LTE environment. In such an aspect, UE 802 does not perform the ESR. Rather, UE 802 sends a page response message in the uplink information transfer message to eNB 804. eNB 804 forwards the page response message IWS 808 (e.g., through the S1 and S102 tunnels). After receiving page response from eNB 804, through MME 806, IWS 808 relays the page response message to 1×MSC 810. At act 818, MSC 810 sends an assignment request message to the IWS 808.

At act 820, IWS 820 processes the assignment request message without any communication with UE 802 or MME 806. At act 822, IWS 808 sends an assignment complete message to MSC 810.

At act 824, MSC 810 sends a message including the SMS message. In one aspect, the message is conveyed using an ADDS Deliver message. In one aspect, the ADDS Deliver message contains SMS message in the ADDS User Part element.

At act 826, IWS 808 processes the received message including the SMS message into a common channel 1×RTT data burst message. In one aspect, the common channel 1×RTT data burst message is communicated through the established tunnel (e.g., A21 tunnel).

At act 828, IWS 808 sends the SMS message to MME 806 in the 1×RTT data burst message as a common channel message over A21 tunnel. In one aspect, MME forwards the common channel 1×RTT data burst to UE 802. In one aspect, if a Layer 2 Ack was solicited, UE 802 acknowledges the receipt of the message (e.g., through a GCSNA L2 Ack). In such an aspect, if MSC 810 has requested a response by including a tag element in an ADDS Deliver message, IWS 808 replies with an ADDS Deliver Ack message when IWS 808 has received acknowledgment from the UE 502 that the message was delivered.

Figure 9:
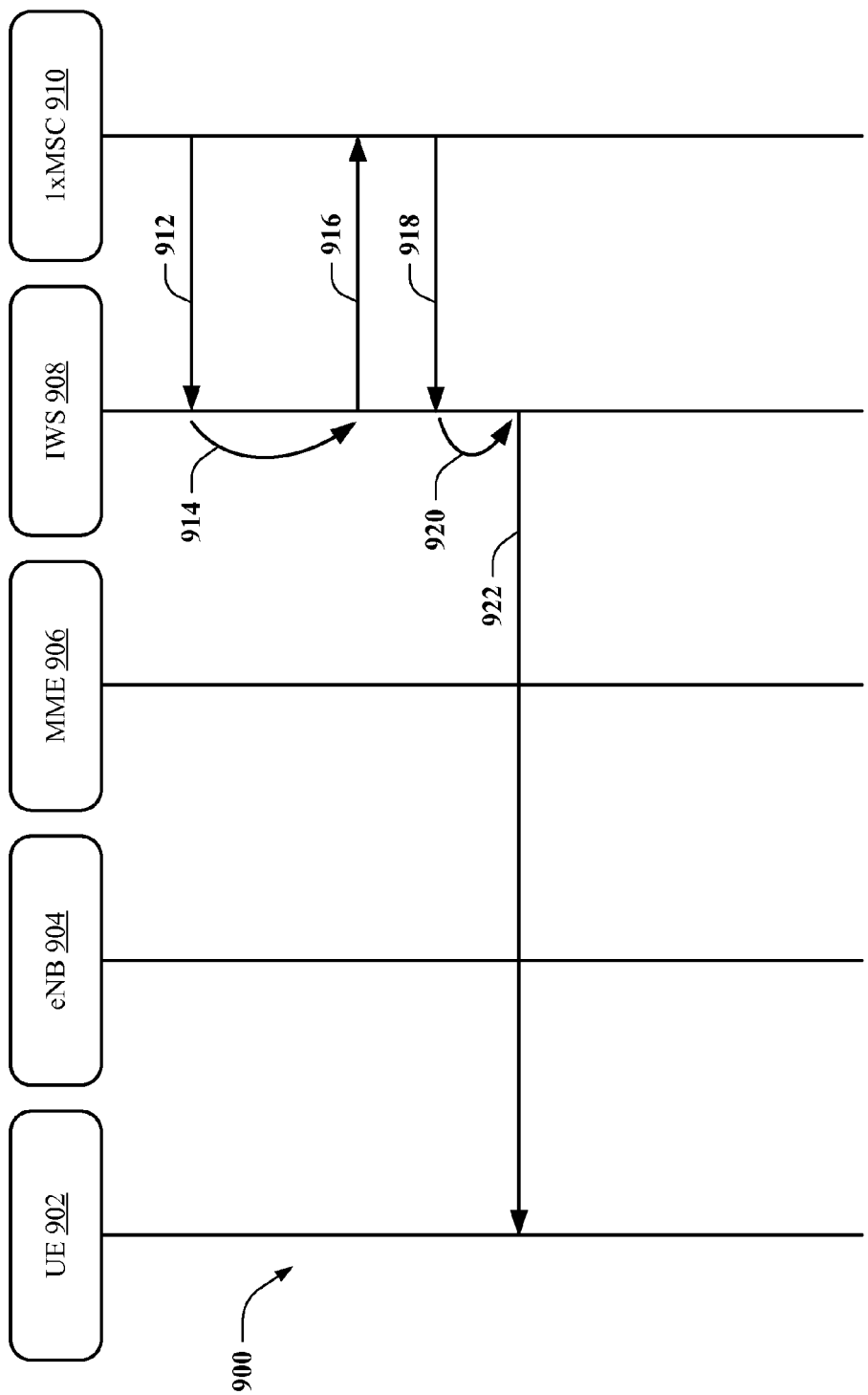
FIG. 9 is a call flow diagram describing another example system for enabling SMS communications over a common channel according to an aspect.

FIG. 9 illustrates a call flow diagram flowchart describing a system 900 for avoiding 1×CSFB for communication of SMS messages in an LTE environment. System 900 includes a UE 902, such as UE 202, eNB 904, such as eNB 206, MME 906, such as MME 212, IWS 908, such as IWS 232, and 1×MSC 910, such as 1×MSC 234. In system 900, IWS 908 uses an assignment failure message to indicate that the requested SMS message is communicated using a LTE tunnel.

At act 912, MSC 910 sends a page request message to IWS 908 indicating a SMS message to be transmitted over the first RAT. In one aspect, if a received SMS message is long, MSC 910 determines for the SMS message to be sent over a 1× traffic channel to a UE 902. In such an aspect, MSC 910 includes a first SMS service option (e.g., SO 6 or 14) with the page request message.

At act 914, IWS 908 analyzes the received page request message and determines that processing the SMS message will result in initiation of an ESR procedure. Accordingly, in response to such a determination, at act 916, IWS 908 sends an assignment failure message to MSC 910. In one aspect, if MSC 910 receives an assignment failure message, MSC 910 interprets the response to indicate that the SMS message is not be suitable for transmission over a 1× traffic channel, and as such MSC 910 sends the SMS message over common channel with ADDS page message.

At act 918, MSC 910 sends a message including the SMS message. In one aspect, the message is conveyed using an ADDS Page message. The ADDS Page message contains SMS message in the ADDS User Part element.

At act 920, IWS 908 processes the received message including the SMS message into a common channel 1×RTT data burst message. In one aspect, the common channel 1×RTT data burst message is communicated through the established tunnel (e.g., A21 tunnel).

At act 922, IWS 908 sends the SMS message to MME 906 in the 1×RTT data burst message as a common channel message over A21 tunnel. In one aspect, MME then forwards a common channel 1×RTT data burst message to UE 902. In one aspect, if a Layer 2 Ack was solicited, UE 902 acknowledges the receipt of the message (e.g., through a GCSNA L2 Ack). In such an aspect, if MSC 910 has requested a response by including a tag element in an ADDS Page message, IWS 908 replies with an ADDS Page Ack message when IWS 908 has received acknowledgment from the UE 902 that the message was delivered.

Figure 10:
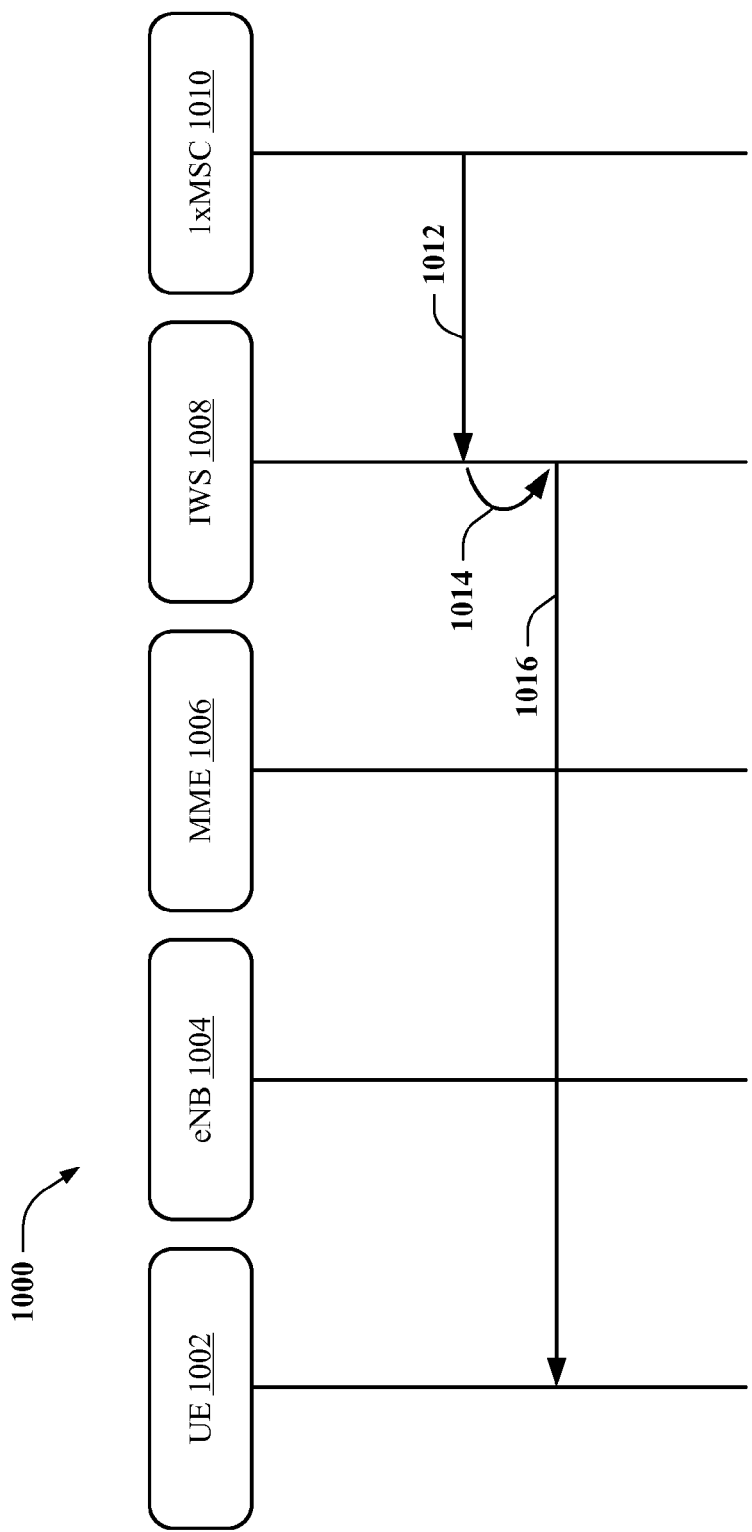
FIG. 10 is a call flow diagram describing another example system for enabling SMS communications over a common channel according to an aspect.

FIG. 10 illustrates a call flow diagram flowchart describing a system 1000 for avoiding 1×CSFB for communication of SMS messages in an LTE environment. System 1000 includes a UE 1002, such as UE 202, eNB 1004, such as eNB 206, MME 1006, such as MME 212, IWS 1008, such as IWS 232, and 1×MSC 1010, such as 1×MSC 234.

In system 1000, MSC 1010 is pre-configured to interact with IWS 1008 so as to avoid initiation of an ESR procedure. At act 1012, based on MSC 1010 pre-configuration, MSC 1010 sends a message including the SMS message. In one aspect, the message is conveyed using an ADDS Page message. The ADDS Page message contains a SMS message in the ADDS User Part element.

At act 1014, IWS 1008 processes the received message including the SMS message into a common channel 1×RTT data burst message. In one aspect, the common channel 1×RTT data burst message is communicated through the established tunnel (e.g., A21 tunnel).

At act 1016, IWS 1008 sends the SMS message to MME 1006 in the 1×RTT data burst message as a common channel message over A21 tunnel. In one aspect, MME then forwards a common channel 1×RTT data burst message to UE 1002. In one aspect, if a Layer 2 Ack was solicited, UE 1002 acknowledges the receipt of the message (e.g., through a GCSNA L2 Ack). In such an aspect, if MSC 1010 has requested a response by including a tag element in an ADDS Page message, IWS 1008 replies with an ADDS Page Ack message when IWS 1008 has received acknowledgment from the UE 502 that the message was delivered.

Figure 11:
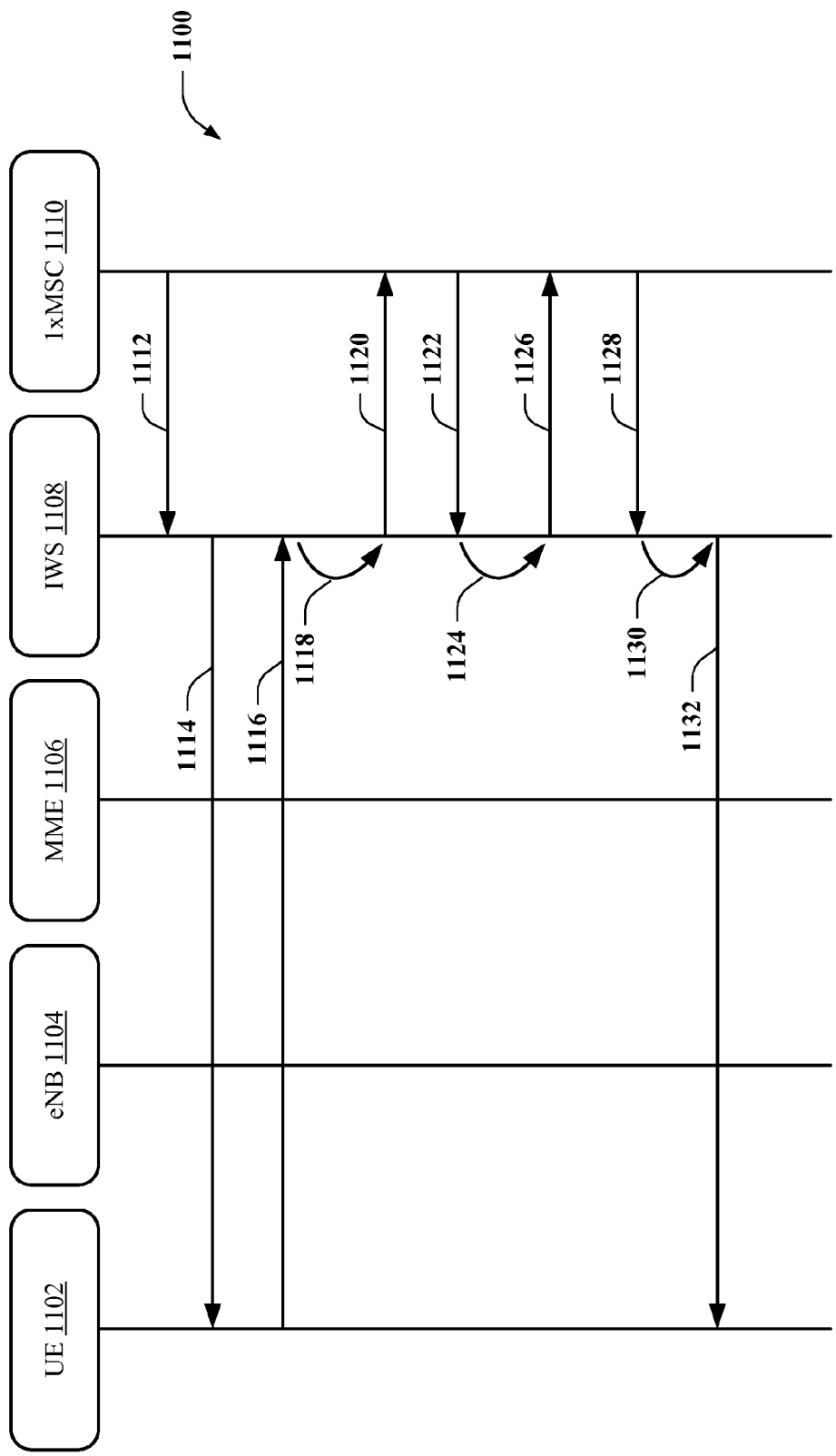
FIG. 11 is a call flow diagram describing another example system for enabling SMS communications over a common channel according to an aspect.

FIG. 11 illustrates a call flow diagram flowchart describing a system 1100 for avoiding 1×CSFB for communication of SMS messages in an LTE environment. System 1100 includes a UE 1102, such as UE 202, eNB 1104, such as eNB 206, MME 1106, such as MME 212, IWS 1108, such as IWS 232, and 1×MSC 1110, such as 1×MSC 234. In system 1100, a registration request order is communicated to UE 1102, rather than a page request message, such as described with reference to FIG. 8.

At act 1112, MSC 1110 sends a page request message to IWS 1108 indicating a SMS message to be transmitted over the first RAT. In one aspect, if a received SMS message is long, MSC 1110 determines for the SMS message to be sent over a 1× traffic channel to a UE 1102. In such an aspect, MSC 1110 includes a first SMS service option (e.g., SO 6 or 14) with the page request message.

At act 1114, IWS 1108 sends a registration request order to MME 1106 (e.g., over an A21 tunnel) in response to receiving the paging request message from MSC 1110. In one aspect, if the UE 1102 is in LTE idle state, the MME 1106 performs a network initiated service request procedure in order to bring the UE 1102 into a LTE active state prior to tunneling the paging request message.

At act 1116, UE 1102 receives the registration request order. UE 1102 sends a registration message in the uplink information transfer message to eNB 1104, and eNB 1104 forwards the registration response message to IWS 1108 (e.g., through the S1 and S102 tunnels). At act 1118, IWS 1108 converts the registration message to a page response message. At act 1120, IWS 1108 sends the page response message to MSC 1110.

At act 1122, MSC 1110 sends an assignment request message to the IWS 1108.

At act 1124, IWS 1120 processes the assignment request message without any communication with UE 1102 or MME 1106. At act 1126, IWS 1108 sends an assignment complete message to MSC 1110.

At act 1128, MSC 1110 sends a message including the SMS message. In one aspect, the message is conveyed using an ADDS Deliver message and contains the SMS message in the ADDS User Part element.

At act 1130, IWS 1108 processes the received message including the SMS message into a common channel 1×RTT data burst message. In one aspect, the common channel 1×RTT data burst message is communicated through the established tunnel (e.g., A21 tunnel).

At act 1132, IWS 1108 sends the SMS message to MME 1106 in the 1×RTT data burst message as a common channel message over A21 tunnel. In one aspect, MME then forwards a common channel 1×RTT data burst message to UE 1102. In one aspect, if a Layer 2 Ack was solicited, UE 1102 acknowledges the receipt of the message (e.g., through a GCSNA L2 Ack). In such an aspect, if MSC 1110 has requested a response by including a tag element in an ADDS Deliver message, IWS 1108 replies with an ADDS Deliver Ack message when IWS 1108 has received acknowledgment from the UE 502 that the message was delivered.

Figure 12:
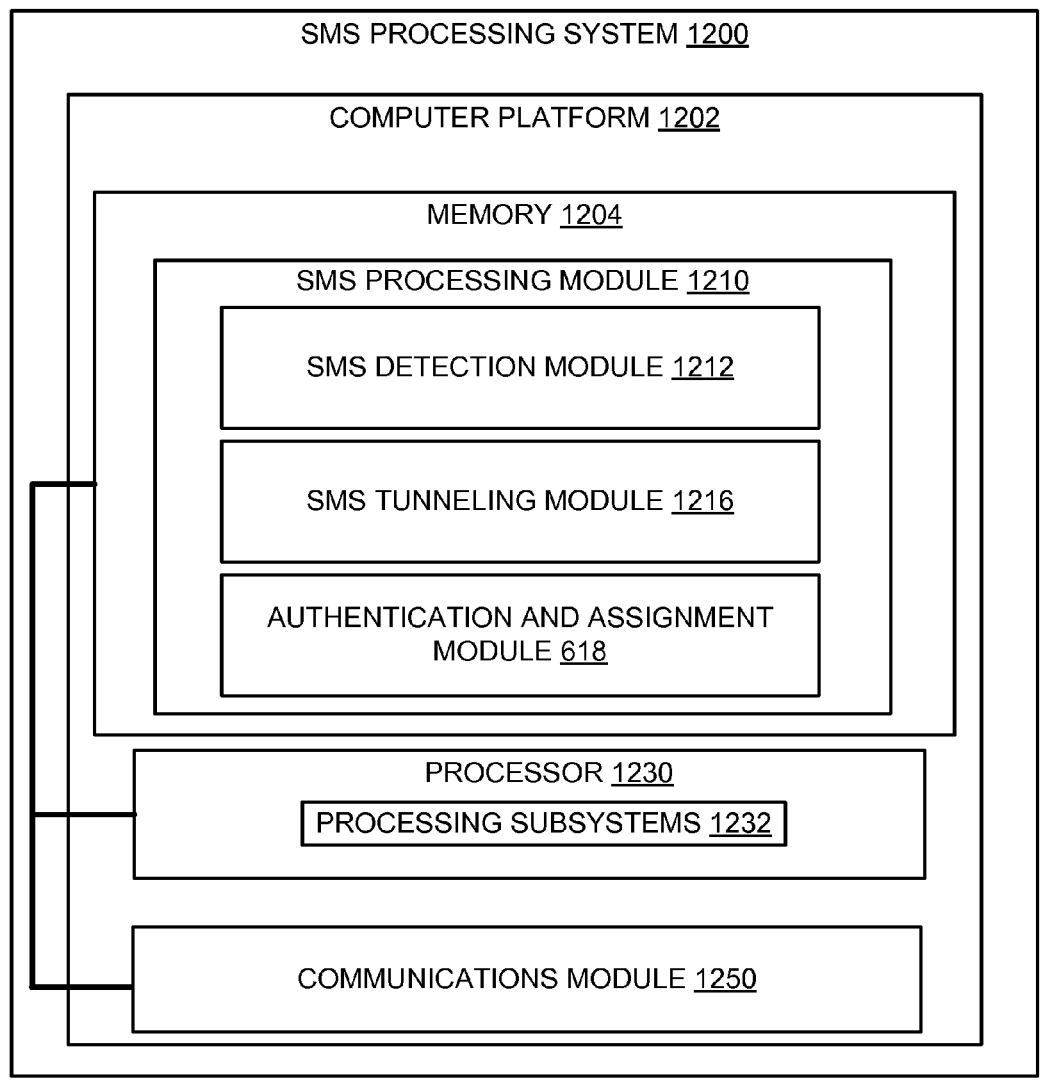
FIG. 12 is an example block diagram of a SMS processing system according to an aspect.

FIG. 12 illustrates a detailed block diagram of SMS processing system 1200, such as IWS server 232 depicted in FIG. 2. SMS processing system 1200 may include at least one of any type of hardware, server, personal computer, mini computer, mainframe computer, or any computing device either special purpose or general computing device. Further, the modules and applications described herein as being operated on or executed by content system 1200 may be executed entirely on a single network device, as shown in FIG. 12, or alternatively, in other aspects, separate servers, databases or computer devices may work in concert to provide data in usable formats to parties, and/or to provide a separate layer of control in the data flow between devices, such as UE 202, mobile station 238, etc., and the modules and applications executed by SMS processing system 1200.

SMS processing system 1200 includes computer platform 1202 that can transmit and receive data across wired and wireless networks, and that can execute routines and applications. Computer platform 1202 includes memory 1204, which may comprise volatile and nonvolatile memory such as read-only and/or random-access memory (ROM and RAM), EPROM, EEPROM, flash cards, or any memory common to computer platforms. Further, memory 1204 may include one or more flash memory cells, or may be any secondary or tertiary storage device, such as magnetic media, optical media, tape, or soft or hard disk. Further, computer platform 1202 also includes processor 1230, which may be an application-specific integrated circuit ("ASIC"), or other chipset, logic circuit, or other data processing device. Processor 1230 may include various processing subsystems 1232 embodied in hardware, firmware, software, and combinations thereof, that enable the functionality of SMS processing system 1200 and the operability of the network device on a wired or wireless network.

In one aspect, processor 1230 may provide means for receiving, by an IWS, a paging request message from a MSC. In one aspect, the paging request message may include a first SMS service option indicating communication of a SMS message using a first RAT. Processor 1230 may further provide means for prompting the SMS processing system 1200 to avoid an ESR procedure by analyzing the first SMS service option in the paging request message, and means for establishing a common channel connection between the IWS and a target UE using a second RAT.

Computer platform 1202 further includes communications module 1250 embodied in hardware, firmware, software, and combinations thereof, that enables communications among the various components of SMS processing system 1200, as well as between SMS processing system 1200, and UE 202. Communication module 1250 may include the requisite hardware, firmware, software and/or combinations thereof for establishing a wireless communication connection. According to described aspects, communication module 1250 may include the necessary hardware, firmware and/or software to facilitate wireless and/or wireline communication between IWS 232 and UE 202.

Memory 1204 of SMS processing system 1200 includes a SMS processing module 1210 which may be operable provide SMS processing services to a UE 202 in an LTE environment without initiating a ESR procedure. In one aspect, SMS processing system 1200 may include SMS detection module 1212, SMS tunneling module 1216, and authentication and assignment module 1218. In operation, SMS detection module 1212 may determines that a received paging message indicates that a SMS message is intended for a UE (e.g., UE 202) and that the SMS message may be of a sufficient size to trigger an ESR procedure (e.g., 1× circuit switched fallback (1×CSFB)) to communicate the SMS message. SMS processing module 1210 may avoid initiating the ESR procedure through a variety of schemes, such as but not limited to schemes discussed with reference to FIGS. 5-11. Further, SMS tunneling module 1216 may establish a common channel connection with the target UE within the LTE environment. In one aspect, SMS processing module 1210 may process a received SMS message using information obtained by authentication and assignment module 1218. In one aspect, authentication and assignment module 1218 obtains information from the target UE. In another aspect, authentication and assignment module 1218 generates authentication and assignment information with SMS processing system for usage in processing the received SMS message.

Figure 13:
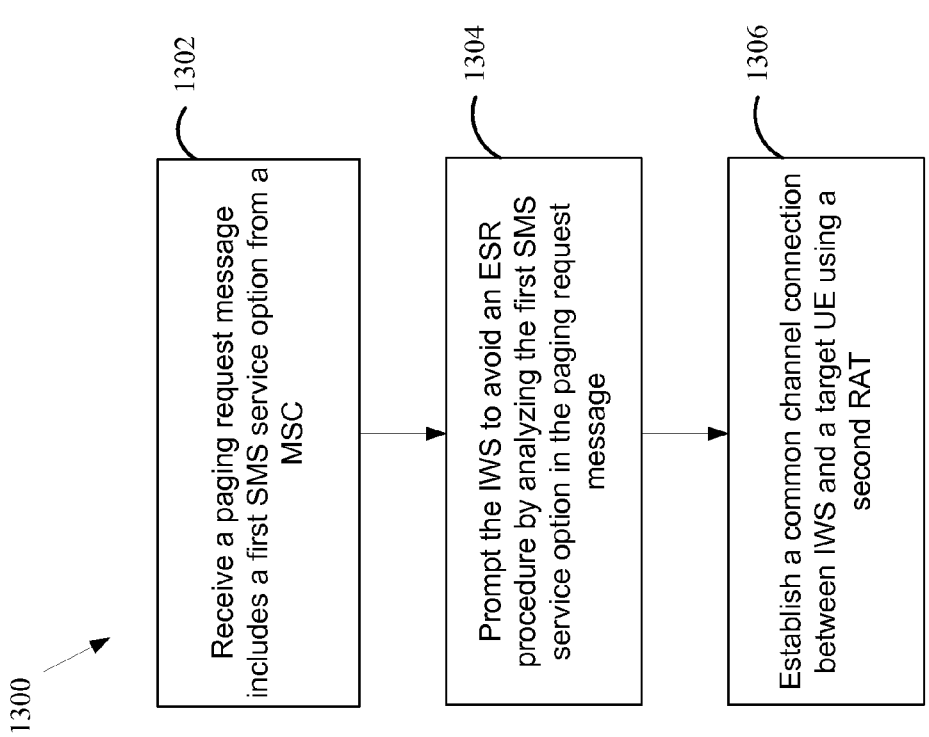
FIG. 13 is a flow chart of a method of wireless communication.

FIG. 13 is a flow chart 1300 of a method of wireless communication. The method receives a paging request message from a MSC using a first RAT (1302). In one aspect, the paging request message may indicate that there is a SMS message intended for a target UE. In another aspect, the paging request message may include a first SMS service option. In another aspect, the first RAT is a 1× circuit switched RAT. In addition, the method prompts the IWS to avoid an ESR procedure by analyzing the first SMS service option in the paging request message (1304). Furthermore, the method establishes a common channel connection between the IWS and the target UE using a second RAT (1306). In one aspect, the second RAT may be a LTE RAT.

Figure 14:
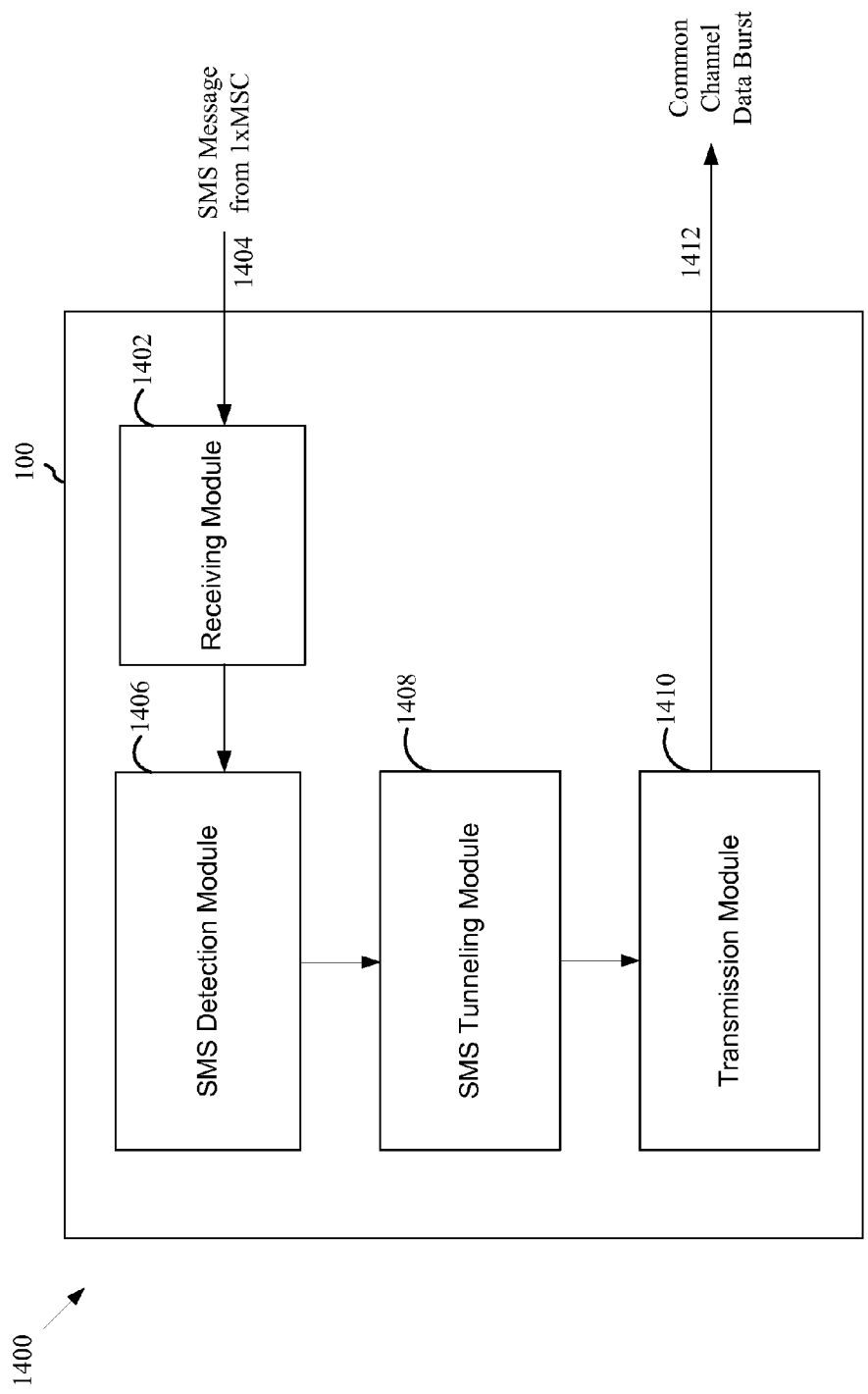
FIG. 14 is a conceptual block diagram illustrating the functionality of an exemplary apparatus.

FIG. 14 is a conceptual block diagram 1400 illustrating the functionality of an exemplary apparatus 100. The apparatus 100 includes a module 1402 that receives an SMS message 1404 from a 1×MSC for a target UE including an SMS service option over a first RAT, a module 1406 that prompts apparatus 100 to avoid initiating an ESR procedure in response to receiving the SMS service option, a module 1408 the establishing a common channel connection with the target UE using a second RAT, and a module 1410 that transmits the SMS message as a common channel data burst 1412 over the second RAT. The apparatus 100 may include additional modules that perform each of the steps in the aforementioned flow charts. As such, each step in the aforementioned flow charts may be performed by a module and the apparatus 100 may include one or more of those modules.

In one configuration, the apparatus 100 for wireless communication includes means for receiving, by an IWS, a paging request message from a MSC. In one aspect, the paging request message includes a first SMS service option indicating communication of a SMS message using a first RAT. The apparatus 100 for wireless communication further includes means for prompting the IWS to avoid an ESR procedure by analyzing the first SMS service option in the paging request message, and means for establishing a common channel connection between the IWS and a target UE using a second RAT. In one aspect, the first RAT and the second RAT may be different. The apparatus 100 for wireless communication further includes means for obtaining authentication parameters and assignment parameters associated with the target UE, and means for transmitting one or more responses to the MSC including the obtained authentication parameters and assignment parameters. The apparatus 100 for wireless communication further includes means for transmitting an assignment failure message to the MSC, means for receiving an ADDS Page message including the SMS message from the MSC, and means for transmitting the common channel data burst message over the established common channel using the second RAT. In such an aspect, the ADDS Page message may be configured to be used to transmit an SMS message using a common channel 1×RTT data burst message using the second RAT, reception of the assignment failure message from the IWS may prompt the MSC to generate the ADDS Page message. In one configuration, the apparatus 100 for wireless communication further includes means for establishing a traffic channel between the MSC and IWS, means for receiving the SMS message from the MSC, wherein the SMS message is configured to be transmitted using the first RAT, means for converting the received SMS message to a common channel 1×RTT data burst message that is configured to be transmitted using the second RAT, and means for transmitting the common channel 1×RTT data burst message containing the received SMS message over the established common channel using the second RAT. In another configuration, the apparatus 100 for wireless communication further includes means for receiving an ADDS Page message including the SMS message from the MSC. In such an aspect, the ADDS Page message may be configured to be used to transmit an SMS message using a common channel 1×RTT data burst message using the second RAT, the MSC may be pre-configured to avoid initiating the ESR procedure. In one aspect, the ESR procedure may be performed in the second RAT. In another configuration, the apparatus 100 for wireless communication further includes means for transmitting a registration request order to a MME associated with the target UE, and means for receiving a registration message from the target UE, through the MME, including the authentication parameters. In another configuration, the apparatus 100 for wireless communication further includes means for generating, by the IWS, a paging response message without receiving the authentication parameters from the target UE, and means for generating an assignment complete message without communicating assignment parameters to the target UE. In another configuration, the apparatus 100 for wireless communication further includes means for replacing the first SMS service option with a tunneling SMS service option. In such an aspect, the tunneling SMS service option may prompt a target UE to avoid initiating the ESR procedure. In another configuration, the apparatus 100 for wireless communication further includes means for transmitting the paging request message to the target UE with the first SMS service option. In such an aspect, the UE may be configured to be supported using the second RAT, and to avoid initiation of the ESR procedure in response to receiving the paging request message over the second RAT. In another configuration, the apparatus 100 for wireless communication further includes means for transmitting a release order to the target UE after the authentication parameters have been obtained. In such an aspect, the release order may prompt the UE to return to an idle state associated with the first RAT while maintaining a connected state associated with the second RAT. In another configuration, the apparatus 100 for wireless communication further includes means for receiving an ADDS Page message including the SMS message from the MSC. In such an aspect, the ADDS Page message may be configured to be used to transmit an SMS message using a common channel 1×RTT data burst message using the second RAT, and the MSC may be pre-configured to avoid initiating the ESR procedure.

The aforementioned means may be one or more of the aforementioned modules of the apparatus 100 (see FIG. 12) and/or the processing system 114 configured to perform the functions recited by the aforementioned means. As described supra, the processing system 114 includes processor 1230. As such, in one configuration, the aforementioned means may be the processor 1230 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   receiving, by an interworking solution (IWS), a paging request message from a mobile switching center (MSC), wherein the paging request message includes a first Short Message Service (SMS) service option indicating communication of a SMS message using a first radio access technology (RAT);
   prompting the IWS to avoid an extended service request (ESR) procedure by analyzing the first SMS service option in the paging request message; and
   establishing a common channel connection between the IWS and a target user equipment (UE) using a second RAT, wherein the first RAT and the second RAT are different.

2. The method of claim 1, further comprising:
   obtaining authentication parameters and assignment parameters associated with the target UE; and
   transmitting one or more responses to the MSC including the obtained authentication parameters and assignment parameters.

3. The method of claim 2, further comprising:
   establishing a traffic channel between the MSC and IWS;
   receiving the SMS message from the MSC, wherein the SMS message is configured by the MSC to be transmitted over the first RAT;
   converting the received SMS message to a common channel data burst message that is configured to be transmitted using the second RAT; and
   transmitting the common channel data burst message containing the received SMS message over the established common channel using the second RAT.

4. The method of claim 3, wherein the receiving the SMS message from the MSC further comprises:
   receiving an ADDS Page message including the SMS message from the MSC, wherein the ADDS Page message is configured to be transmitted as the common channel data burst message using the second RAT, and wherein the MSC is pre-configured to avoid initiating the ESR procedure.

5. The method of claim 2, wherein the obtaining further comprises:
   transmitting a registration request order to a mobility management entity (MME) associated with the target UE; and
   receiving a registration message from the target UE, through the MME, including the authentication parameters.

6. The method of claim 2, wherein the obtaining further comprises:
   generating, by the IWS, a paging response message without receiving the authentication parameters from the target UE; and
   generating an assignment complete message without communicating assignment parameters to the target UE.

7. The method of claim 1, wherein the prompting further comprises:
   transmitting an assignment failure message to the MSC; and
   receiving an application data delivery service (ADDS) Page message including the SMS message from the MSC, wherein the ADDS Page message is configured to be transmitted as a common channel data burst message using the second RAT, wherein reception of the assignment failure message from the IWS prompts the MSC to generate the ADDS Page message; and
   transmitting the common channel data burst message over the established common channel using the second RAT.

8. The method of claim 1, wherein the first RAT is a 1× circuit switched RAT and wherein the second RAT is a long term evolution (LTE) RAT.

9. The method of claim 1, wherein the SMS message comprises SMS content greater than or equal to a threshold data size used to trigger 1× circuit switched fallback.

10. The method of claim 1, wherein the first service option includes a first service option indicator that prompts the target UE to trigger 1× circuit switched fallback, and wherein the target UE avoids initiating 1× circuit switched fallback.

11. The method of claim 1, wherein the prompting further comprises:
    replacing the first SMS service option with a tunneling SMS service option, wherein the tunneling SMS service option prompts the target UE to avoid initiating the ESR procedure.

12. The method of claim 1, wherein the prompting further comprises:
    transmitting the paging request message to the target UE with the first SMS service option, wherein the target UE is configured to be supported using the second RAT, and configured to avoid initiating the ESR procedure in response to receiving the paging request message over the second RAT.

13. The method of claim 12, further comprising:
    transmitting a release order to the target UE after the authentication parameters have been obtained, wherein the release order prompts the target UE to return to an idle state associated with the first RAT while maintaining a connected state associated with the second RAT.

14. The method of claim 1, wherein the receiving further comprises:
    receiving an ADDS Page message including the SMS message from the MSC, wherein the ADDS Page message is configured to be transmitted as a common channel data burst message using the second RAT, and wherein the MSC is pre-configured to avoid initiating the ESR procedure.

15. An apparatus for wireless communication, comprising:
    means for receiving, by an IWS, a paging request message from a MSC, wherein the paging request message includes a first Short Message Service (SMS) service option indicating communication of a SMS message using a first RAT;
    means for prompting the IWS to avoid an ESR procedure by analyzing the first SMS service option in the paging request message; and
    means for establishing a common channel connection between the IWS and a target UE using a second RAT, wherein the first RAT and the second RAT are different.

16. A computer program product, comprising:
    a non-transitory computer-readable medium comprising:
    code for receiving, by an IWS, a paging request message from a MSC, wherein the paging request message includes a first Short Message Service (SMS) service option indicating communication of a SMS message using a first RAT;
    code for prompting the IWS to avoid an ESR procedure by analyzing the first SMS service option in the paging request message; and
    code for establishing a common channel connection between the IWS and a target UE using a second RAT, wherein the first RAT and the second RAT are different.

17. An apparatus for wireless communication, comprising:
a processing system configured to:
receive, by an IWS, a paging request message from a MSC, wherein the paging request message includes a first Short Message Service (SMS) service option indicating communication of a SMS message using a first RAT;
prompt the IWS to avoid an ESR procedure by analyzing the first SMS service option in the paging request message; and
establish a common channel connection between the IWS and a target UE using a second RAT, wherein the first RAT and the second RAT are different.

18. The apparatus of claim 17, wherein the processing system is further configured to:
obtain authentication parameters and assignment parameters associated with the target UE; and
transmit one or more responses to the MSC including the obtained authentication parameters and assignment parameters.

19. The apparatus of claim 18, wherein the processing system is further configured to:
establish a traffic channel between the MSC and IWS;
receive the SMS message from the MSC, wherein the SMS message is configured by the MSC to be transmitted over the first RAT;
convert the received SMS message to a common channel data burst message that is configured to be transmitted using the second RAT; and
transmit the common channel data burst message containing the received SMS message over the established common channel using the second RAT.

20. The apparatus of claim 19, wherein the processing system is further configured to:
receive an ADDS Page message including the SMS message from the MSC, wherein the ADDS Page message is configured to be transmitted as the common channel data burst message using the second RAT, and wherein the MSC is pre-configured to avoid initiating the ESR procedure.

21. The apparatus of claim 18, wherein the processing system is further configured to:
transmit a registration request order to a MME associated with the target UE; and
receive a registration message from the target UE, through the MME, including the authentication parameters.

22. The apparatus of claim 18, wherein the processing system is further configured to:
generate, by the IWS, a paging response message without receiving the authentication parameters from the target UE; and
generate an assignment complete message without communicating assignment parameters to the target UE.

23. The apparatus of claim 17, wherein the processing system is further configured to:
transmit an assignment failure message to the MSC;
receive an ADDS Page message including the SMS message from the MSC, wherein the ADDS Page message is configured to be transmitted as a common channel data burst message using the second RAT, wherein reception of the assignment failure message from the IWS prompts the MSC to generate the ADDS Page message; and
transmit the common channel data burst message over the established common channel using the second RAT.

24. The apparatus of claim 17, wherein the first RAT is a 1× circuit switched RAT and wherein the second RAT is a LTE RAT.

25. The apparatus of claim 17, wherein the SMS message comprises SMS content greater than or equal to a threshold data size used to trigger 1× circuit switched fallback.

26. The apparatus of claim 17, wherein the first service option includes a first service option indicator that prompts the target UE to trigger 1× circuit switched fallback, and wherein the target UE avoids initiating 1× circuit switched fallback.

27. The apparatus of claim 17, wherein the processing system is further configured to:
replace the first SMS service option with a tunneling SMS service option, wherein the tunneling SMS service option prompts the target UE to avoid initiating the ESR procedure.

28. The apparatus of claim 17, wherein the processing system is further configured to:
transmit the paging request message to the target UE with the first SMS service option, wherein the target UE is configured to be supported using the second RAT, and configured to avoid initiating the ESR procedure in response to receiving the paging request message over the second RAT.

29. The apparatus of claim 28, wherein the processing system is further configured to:
transmit a release order to the target UE after the authentication parameters have been obtained, wherein the release order prompts the target UE to return to an idle state associated with the first RAT while maintaining a connected state associated with the second RAT.

30. The apparatus of claim 17, wherein the processing system is further configured to: receive an ADDS Page message including the SMS message from the MSC, wherein the ADDS Page message is configured to be transmitted as a common channel data burst message using the second RAT, and wherein the MSC is pre-configured to avoid initiating the ESR procedure.

31. A method of wireless communications, comprising:
establishing a common channel connection between a target user equipment (UE) and an interworking solution (IWS) using a second radio access technology (RAT);
receiving, at the target UE, a paging-related message from the IWS over the second RAT, wherein the paging-related message includes a first Short Message Service (SMS) service option indicating communication of a SMS message using a first RAT; avoiding, at the target UE, an extended service request (ESR) procedure in response to receiving the paging-related message on the second RAT; and transmitting a page response message in an uplink information transfer message, via the common channel connection, from the target UE to the IWS.

32. The method of claim 31, wherein receiving the paging-related message further comprises receiving a common channel data burst message, wherein the common channel data burst message is a reconfigured ADDS Page message or is a converted SMS message.

33. The method of claim 31, wherein the first service option includes a first service option indicator that prompts the target UE to trigger 1× circuit switched fallback, and further comprising avoiding, by the target UE, initiating 1× circuit switched fallback based on the first service option indicator.

34. The method of claim 31, wherein receiving the paging-related message based on the first SMS service option further comprises one of:

receiving the paging-related message with a tunneling SMS service option in place of the first SMS service option, wherein the tunneling SMS service option prompts the avoiding of the ESR procedure by the target UE; and receiving a paging request message with the first SMS service option, wherein the target UE is configured to be supported using the second RAT, and configured to avoid initiating the ESR procedure in response to receiving the paging request message over the second RAT.

35. The method of claim 31, further comprising:

receiving a release order at the target UE after authentication parameters have been obtained by the IWS, wherein the release order prompts the target UE to return to an idle state associated with the first RAT while maintaining a connected state associated with the second RAT.

36. An apparatus for wireless communication, comprising: a processing system configured to: establish a common channel connection between a target user equipment (UE) and an interworking solution (IWS) using a second radio access technology (RAT); receive, at the target UE, a paging-related message from the IWS over the second RAT, wherein the paging-related message includes a first Short Message Service (SMS) service option indicating communication of a SMS message using a first RAT; avoid, at the target UE, an extended service request (ESR) procedure in response to receiving the paging-related message on the second RAT; and transmit a page response message in an uplink information transfer message, via the common channel connection, from the target UE to the IWS.

37. The apparatus of claim 36, wherein the paging-related message further comprises a common channel data burst message, wherein the common channel data burst message is a reconfigured ADDS Page message or is a converted SMS message.

38. The apparatus of claim 36, wherein the first service option includes a first service option indicator that prompts the target UE to trigger 1× circuit switched fallback, and wherein the processing system is further configured to cause the target UE to avoid initiating 1× circuit switched fallback based on the first service option indicator.

39. The apparatus of claim 36, wherein the paging-related message based on the first SMS service option further comprises one of:

the paging-related message with a tunneling SMS service option in place of the first SMS service option, wherein the tunneling SMS service option prompts the target UE to avoid the ESR procedure; and a paging request message with the first SMS service option, wherein the target UE is configured to be supported using the second RAT, and configured to avoid initiating the ESR procedure in response to receiving the paging request message over the second RAT.

40. The apparatus of claim 36, wherein the processing system is further configured to receive a release order after authentication parameters have been obtained by the IWS, wherein the release order prompts the target UE to return to an idle state associated with the first RAT while maintaining a connected state associated with the second RAT.

* * * * *